United States Patent Office 3,305,602
Patented Feb. 21, 1967

3,305,602
COATING COMPOSITIONS (A) A VINYL CHLORIDE ORGANOSOL (B) A VINYL CHLORIDE COPOLYMER SOLUTION (C) AN ACRYLIC RESIN COMPONENT (D) A BUTYLATED UREA-FORMALDEHYDE AND OPTIONALLY, (E) A VINYL CHLORIDE-VINYLIDENE CHLORIDE SOLUTION
Edward J. Bromstead, Waukegan, Ill., assignor to Midland Industrial Finishes Company, Inc., Waukegan, Ill., a corporation of Illinois
No Drawing. Filed Apr. 27, 1962, Ser. No. 190,818
2 Claims. (Cl. 260—853)

This invention relates to coating compositions and metal surfaces coated therewith.

These coating compositions may be easily applied as a liquid and baked on the surfaces of a wide variety of metals without requiring the prior application of a primer coating composition. The resulting baked-on coating adheres tenaciously to the underlying surface and has good toughness properties.

Further, by controlling the preparation of and constituents in the coating composition (substantially homogeneous), one may prepare a composition that produces a coating with (a) either a high gloss finish or low gloss finish with low or high angular sheen, (b) good color retention, (c) good weatherability, (d) good chemical resistance, and (e) good flexibility. The outstanding flexible and adhesive qualities of the coating permit the coated metal to be fabricated (for example, bent in a brake or by roll-formers) or further treated or shaped for its end use without chipping, peeling or fracturing from the metal surface to expose said surface.

Still further, the liquid coating composition may be stored, prior to its application to metal surfaces, for periods of about six months without any material change in its viscosity, although some increase gradually occurs during this period. However, if the composition is to be stored for longer periods of time, the viscosity may be adjusted by adding solvents and diluents.

My coating compositions are particularly well-suited for coating galvanized ferrous metals such as steel because of its outstanding adhesion properties, although it may also be used to coat aluminum, steel, copper and zinc die castings. The metal need not be first coated with an organic primer, however, the metal should be first treated in the customary manner with a conversion coating. Galvanized steel and "Bonderite 900"; respectively, may be effectively treated, for example, with "Bonderite 37." "Bonderite 37" forms a crystalline zinc phosphate coating on galvanized steel and is described in U.S. Patent 2,835,617. U.S. Patent 2,609,308 describes the application of "Bonderite 900" to steel. If my coating composition is to be applied to aluminum, the aluminum may be treated with Alodine 1200S, that is described in U.S. Patent 2,988,465.

The liquid coating compositions embraced by my invention may be applied to metal surfaces by the usual roll-coating machines, or they may be applied by brushing, spraying or dipping operations. After the liquid coating composition is applied to the metal surfaces, the coated metal should be baked for approximately 1–4 minutes at about 350–450° F. I have found that excellent results are obtained when the coated metal is baked for 1½ minutes at 400° F.

It is indeed remarkable that a substantially homogeneous liquid coating could be prepared having a combination of such outstanding characteristics.

The liquid coating compositions (as applied to the surfaces to be coated) embraced by this invention should contain the following components:
(a) An organosol dispersion resin component;
(b) A solvent or diluent;
(c) A plasticizer;
(d) A stabilizer;
(e) A vinyl chloride copolymer solution resin component;
(f) A vinyl chloride-vinylidene chloride solution resin component;
(g) An acrylic resin component comprising a non-air-drying acrylic casting type resin syrup and/or an air-dry or bake (thermoplastic of thermosetting) solution type acrylic resin;
(h) A urea-formaldehyde solution grade resin component; and
(i) A pigment.

If desired, the pigment may be omitted. The stabilizer and/or vinyl chloride-vinylidene chloride components may likewise be omitted; however, superior results are obtained when they are present in the coating composition.

Components (e)–(h), above, are considered as being organosol resin modifiers.

The term "organosol" herein refers to compositions that contain vinyl chloride polymer and volatile dispersing liquid and/or diluent.

The plasticizer, modifying resins, diluent and solvent may be separately incorporated into the liquid coating composition or added thereto as part of the organosol component.

The organosol dispersion component is a dispersion of a vinyl chloride resin, such as polyvinyl chloride and/or polyvinyl chloride-diethyl maleate copolymer resin. It contains, in addition to the resin, a diluent and/or dispersant. The vinyl resin should contain more than about 80% by weight, preferably at least about 90% by weight, of polymerized vinyl chloride. Particularly good results are obtained with a vinyl chloride resin having an average molecular weight from about 18,000–20,000 to higher values.

A stabilizing agent that inhibits thermal and ultraviolet decomposition is used in conjunction with the vinyl chloride resin. In addition, if desired, a suitable plasticizer may be present in or added to the organosol resin component.

Commercially available vinyl chloride dispersion grade resins such as the following may be used in the organosol component: "Bakelite QYNV," a white powdered solid containing about 98–99% by weight polyvinyl chloride, and has a specific gravity of about 1.40 and a specific viscosity from about 0.240 to 0.32 as measured by 0.2 gm. resin per 100 ml. of nitrobenzene at 20° C.; "Opalon 410," a dispersion grade polyvinyl chloride of a stir-in type having the following properties: consistency—powder, color—white, specific gravity—about 1.40, specific viscosity (solution of 0.40 gm. of polymer in 100 ml. of cyclohexanone at 25° C.)—0.53–0.55, particle size—1–2 microns, dry bulk density—about 0.25–0.35 gm./cc., loss in weight on heating—about 0.5% max., ash—about 0.5% max.; "Geon 121," a stir-in type high molecular weight polyvinyl chloride resin in the form of a fine white powder, has a specific gravity of about 1.4, a bulk density of about 20–25 lbs./ft.$^3$, and has a specific viscosity of about 0.57–0.63; "Exon 654," a high molecular weight dispersion type polyvinyl chloride (white powder) product having a specific gravity of about 1.4 and average relative viscosity of about 2.65; and "Pliovic AO," is a vinyl chloride dispersion resin or copolymer containing about 95% by weight vinyl chloride and some other modifying monomer such as diethyl maleate units (similar products are shown in Bair Patent 2,492,086), has an average particle size of 1–2 microns, an intrinsic viscosity of 0.85, a specific gravity of 1.39, and a bulk density (packed) of 21.5 lbs./ft.$^3$.

My preferred vinyl chloride dispersion resin is "Bakelite QYNV."

The organosol component contains a diluent and/or dispersant such as exemplified by aliphatic hydrocarbons such as V.M. and P. naphtha, aromatic hydrocarbons (e.g., "Penola 150," toluol and xylol), esters (e.g., butyl acetate, amyl acetate), ketones (e.g., diacetone alcohol, methyl ethyl ketone, methyl isobutyl ketone, isophorone, and diisobutyl ketone), glycol ethers (e.g., diethylene glycol monobutyl ether and diethylene glycol monoethyl ether), and nitro-paraffins (2-nitropropane). ("Penola 150," a product of Penola Oil Co., has 94% by volume aromatics (ASTM-D-875), a mixed aniline point (° C.) of 20, a flash point (Tag closed cup, ° F.) of 150, a Kauri-Butanol value of 89.1 and a specific gravity (60/60 ° F.) of 0.8925).

The aliphatic hydrocarbons and aromatic hydrocarbons serve as diluents. The ketones, esters and nitro-paraffins serve as dispersants. The glycol ethers are both diluents and dispersants.

The organosol component also includes or is used in conjunction with a plasticizer. The plasticizer, for example, may be a phthalate ester, an ester of a straight chain dibasic acid, a phosphate ester, or a polyester. More specifically, the plasticizer may be a member of the group comprising dioctyl phthalate, diisooctyl phthalate, didecyl phthalate, n-octyl n-decyl phthalate, diisodecyl phthalate, dioctyl adipate, diisoadipate, dibutyl adipate, diisodecyl adipate, n-octyl n-decyl adipate, tricresyl phosphate, cresyl phenyl phosphate, trioctyl phosphate, dibutyl sebacate, dioctyl sebacate, an epoxidized oil such as "Paraplex G-62," and a lower alkylene glycol (e.g., propylene glycol) polyester of azelaic acid having an average molecular weight of 4,000–6,000, an acid number of <5 and a hydroxy value of <20. "Paraplex G-62" has a molecular weight (average) of about 1,000, a color (Gardner Varnish Scale) of 2 (max.), a specific gravity (25° C./15° C.) of about 0.999, a density of about 8.3 lbs. per gallon, a viscosity (poises, 25° C.) of about 3 to 4, a refractive index ($N_D^{25°}$) of about 1.471, a freezing point of about +2° C., a flash point (° C.) of about 316, an acid number (mgs. KOH/gm.) of about 1 (max.) and a saponification number (mgs. KOH/gm.) of about 182.

The organosol component includes or is used in conjunction with a stabilizer that inhibits thermal and ultraviolet decomposition. Liquid epoxy resins may be used wherein the viscosity is about 500 cps. —20,000 cps. and the epoxide eqyuivalent is about 140–375. An epoxy resin may be used such as "Bakelite ERL-2774." "Bakelite ERL-2774" is a low molecular weight epoxy resin in the form of a viscous liquid having a structural formula:

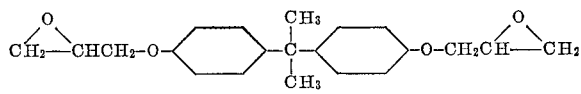

and has a specific gravity of about 1.15–1.17, a color (Gardner 1933 Standard) of 10 (max.), an epoxide equivalent of about 185–200, and is soluble (clear to light haze) in aromatics, ketones, and alcohols, but settles out in aliphatics. "Nuostabe 953," a tin-organic liquid product, may also be used. Nuostabe 953 consists of 90% dibutyl tin dilaurate and 10% mineral spirits.

The vinyl chloride copolymer solution grade resin component contains a predominance of vinyl chloride (e.g., above about 60%) and has, for example, an average molecular weight of about 5,000–16,000. For purposes of the invention, commercially available products such as follows may be used: "Bakelite VMCH"; "Exon 470"; "Geon 400-X-110"; "Bakelite VYHH"; "Bakelite VMCC"; and "Bakelite VAGH." "Bakelite VMCH" is preferred.

These vinyl chloride copolymer solution grade resins may be more specifically identified as follows: "Bakelite VMCH" is a white, powdered solid containing a solvent polymerized vinyl chloride-vinyl acetate copolymer (since the product contains a predominance of vinyl chloride and vinyl acetate, it may be considered as being a copolymer despite its inclusion of some small amount of maleic acid) with a chemical composition of about 85.0 to 88.0% by weight of vinyl chloride, about 11.0 to 14.0% by weight vinyl acetate, about 0.8 to 1.2% by weight maleic acid, and having a specific viscosity from about 0.536 to 0.567 as measured by 1.0 gm. resin per 100 ml. of solution in methyl isobutyl ketone at 25° C.; "Exon 470" is a vinyl chloride-one-half lower alkyl ester of maleic acid copolymer such as vinyl chloride—a one-half dibutyl maleate ester type copolymer (granular powder), as disclosed in Rowland et al. Patent 2,731,449, reissued as Reissue Patent 24,206, and has a specific gravity of about 1.31, a bulk density (dry) of about 0.8 gm./cc., a bulk density (solution) of about 0.091 gal./lb., and a relative viscosity (1% in cyclohexanone) of about 1.35; "Geon 400-X-110" is a vinyl chloride-vinyl acetate copolymer having about 91%±2% vinyl chloride, about 6%±2% vinyl acetate and about 3%±2% maleic acid; "Geon 400-X-110" a white powder, has been reported to have a specific viscosity (at 20° C.) of 0.24, a tensile strength of (2 mil film) 6500, and 22–26% maximum working solvents; "Bakelite VYHH" contains about 87% by weight vinyl chloride and about 13% by weight vinyl acetate, and has an intrinsic viscosity of about 0.50–0.55 measured in cyclohexanone at 20° C.; "Bakelite VMCC" is a copolymer that is in the form of a dry white powder comprising about 84% vinyl chloride, about 15% vinyl acetate and about 0.8% interpolymerized maleic acid; and "Bakelite VAGH" contains about 91% by weight vinyl chloride and about 3% by weight vinyl acetate and about 6% by weight vinyl alcohol in the polymer which is produced by "back-hydrolyzing" some of the vinyl acetate, and has an intrinsic viscosity of about 0.57 measured in cyclohexanone at 20° C.

I prefer to use the vinyl chloride-vinyl acetate solution resin (i.e., "Bakelite VMCH" and "Bakelite VMCC") instead of the vinyl chloride-maleate solution resin.

The vinyl chloride-vinylidene chloride solution resin component may be omitted from the liquid coating composition, but we much prefer that it be present because it adds moisture resistance or moisture impermeability properties to the baked-on coating. This component may consist of products such as "Geon 222." "Geon 222" is a copolymer of vinyl chloride and vinylidene chloride in proportions of about 26–44.5% by weight vinylidene chloride, has a chlorine content of about 61–64% by weight, and has a specific viscosity of about 0.15–0.30 determined at 20° C. in 0.4% solution of nitrobenzene.

The acrylic resin syrup may be used irrespective of whether the coating is to have either high gloss or low gloss with low or high angular sheen. The acrylic syrup enhances the adhesion of the coating to metal and, most important, it contributes significantly to the flexibility and exterior durability of the baked-on coating. However, an inferior, but usable high or low gloss coating composition having reduced flexibility may be prepared by replacing all or some of the acrylic syrup with an air-dry or bake acrylic resin solution.

The syrup should be of the type disclosed in Belgian Patent 572,359, based on an application filed in the U.S. on November 5, 1957. For example, "Lucite 204-X" Acrylic Syrup may be used, and is described in the Belgian patent. "Lucite 204-X" has a viscosity of 15±1 poises and a color, as measured as an APHA No., of not over about 15, a specific gravity as shipped of 1.02, a specific gravity when completely polymerized of 1.18, and the refractive index of the cured or polymerized resin is 1.49. The activity of "Lucite 204-X" was measured on the Sunshine Gel Meter at 60° C. with 2% benzoyl peroxide dry powder as the catalyst, and was found to have about 35 minutes gel time.

The acrylic syrup should contain at least about 20% by weight of polymeric methyl methacrylate in methyl methacrylate monomer. The polymeric methyl methacrylate should have an intrinsic viscosity, at 0.5 gram per deciliter, of about 0.25–1.0, measured in liquid chloroform. The syrup should have a viscosity between about 0.5–50 poises at 25° C. and contain less than 20 p.p.m. of a polymerization initiator.

The syrup can be prepared by one of several suitable processes. For example, by partially polymerizing methyl methacrylate monomer by a process that produces the required polymer. Alternatively, a desired amount of methyl methacrylate polymer of the required intrinsic viscosity may be dissolved in methyl methacrylate monomer.

In the former process, the syrup may be prepared by heating methyl methacrylate ester, free of polymerization inhibitor but containing a small quantity of polymerization initiator, in the presence of a chain transfer agent until the solution reaches a predetermined viscosity. The polymerization may be stopped by adding cold methyl methacrylate monomer containing a polymerization inhibitor such as hydroquinone. For example, a syrup having a viscosity of between about 1–50 poises may be produced with methyl methacrylate monomer, a small predetermined amount of initiator, and about 0.05–1.0 mole percent of a chain transfer agent. This reaction mixture should be heated to a temperature of about 50–150° C. until the desired viscosity is reached and the initiator content is below 20 parts per million. Polymerization is then stopped by cooling the reaction mixture, for example, by adding 1–10 parts by weight of cold methyl methacrylate containing sufficient hydroquinone to inhibit completely the polymerization.

An air-dry or bake solution type acrylic resin may be used with or without the acrylic syrup. The acrylic solution type resin is primarily used to produce a coating with high gloss, although it also enhances, to some degree, the exterior durability and adhesion properties of the baked-on coating.

For example, the solution type acrylic resin includes resins such as polymers and/or copolymers of methyl, ethyl, n-butyl and isobutyl methacrylate or acrylate. "Acryloid B–44," "Acryloid A–21," and "Acryloid B–72" may be used; however, I prefer to use "Acryloid B–72." "Acryloid B–44 and A–21" are described in U.S. Patent 2,881,155 and these particular products are polymers of esters of acrylic and methacrylic acids which contain nitrogenous heterocylic rings rendering the polymers susceptible to condensation reactions. "Acryloid B–72" is an alkyl acrylate-alkyl methacrylate copolymer wherein the alkyl substituents have not more than three carbon atoms. "Acryloid B–44" contains about 40% resin and a toluol solvent, and has a specific gravity of 0.97, a density of 8.1 lbs./gal., a viscosity of 600–1100 centipoises at 30° C., a color of T–W (Gardner Holdt Scale), and a flash point of 39° F. (closed cup, Tag). "Acryloid B–72" contains about 40% resin and a toluol solvent, and has a specific gravity of 0.97, a viscosity at 30° C. of 480–640, a color of R–U (Gardner-Holdt), and a flash point of 39° F. (closed cup, Tag).

The urea-formaldehyde solution grade resin component gives my liquid coating composition good adhesion properties when it is applied to galvanized steel. Commercially available urea-formaldehyde products such as "P–138–60 Beckamine Solution" or "Uformite F–240" are compatible with the volatile materials in my liquid coating composition, although I prefer to use admixtures of these products. "P–138–60 Beckamine Solution" is a butylated urea-formaldehyde resin having about 38–43% volatile materials (i.e., xylol-butanol), a viscosity (Gardner-Holdt) of R–T, and an acid number of 2–5. "Uformite F–240" is a butylated urea-formaldehyde resin having about 38–42% volatile materials (i.e., 1 xylol:1.5 butanol), a viscosity (Gardner-Holdt) of L–Q, and an acid number of 3–8.

When "Uformite F–240" and "P–138–60 Beckamine" are both present in my coating composition, the "Uformite F–240" imparts storage stability to "P–138–60 Beckamine" and enables the composition to provide a more uniform or homogeneous film, whereas the "P–138–60 Beckamine" gives the film improved hardness.

The pigment selected for use in the liquid coating composition should be non-reactive. Since basic pigments induce gelation, neutral pigments should be used, such as titanium dioxide (rutile or non-chalking rutile), cadmium yellow, phthalocyanine blue and green, cadmium red, quinacridone red, carbon black, synthetic pure iron oxides and flaked aluminum pigments.

When one wishes to produce a coating having a low gloss, flatting agents such as fine-particle-size silica may be incorporated into the liquid coating composition.

Silica products such as "Santocel 54" and "Syloid 162" may be used as flatting agents.

"Santocel 54" is a light, fluffy, white silica aerogel having 94% "dead air." It is composed of sub-ultramicroscopic fibers of silica having a diameter of about 25–35 angstroms spaced about 300 angstroms apart. It has an average particle size of 0.5–3.0 microns, an absolute density of 17.1 lbs./gal., an oil absorption value of 2.5 gm. oil/gm. (ASTM) and an index of refraction of 1.464.

"Syloid 162" is a synthetic silica flatting agent. This product is a uniform free-flowing powder having an average radius of 4.5–6.5 microns, a dry bulk density (compacted) of 23 lbs./ft.$^3$, a bulking value of 0.0606 solid gal./lb., and an oil absorption value of 145.

The liquid coating composition should have about 20–70% by weight non-volatile material, preferably about 35–70% by weight non-volatile material.

Table I illustrates various proportions that may be used to prepare either a satisfactory flat or high gloss liquid coating composition.

TABLE I.—LIQUID FLAT, SATIN OR HIGH GLOSS LIQUID COMPOSITION

| Non-volatile constituents: | Percent by weight based on weight of non-volatile materials |
|---|---|
| Acrylic resin component | 0.5–10 |
| Solution resins: | |
|   Vinyl chloride-vinyl acetate copolymer and/or vinyl chloride-one-half lower alkyl ester of maleic acid component | 5–30 |
|   Vinyl chloride-vinylidene chloride copolymer resin | 0–10 |
| Dispersion resin(s): | |
|   Vinyl chloride resin (e.g., vinyl chloride polymer and/or vinyl chloride-diethyl maleate copolymer) | 10–50 |
| Urea-formaldehyde resin(s) | 1–10 |
| Stabilizer | 0.5–6 |
| Plasticizer | 5–20 |
| Pigment | 0–60 |

| Volatile constituents: | Percent by weight based on weight of volatile materials |
|---|---|
| Diluent | 0–60 |
| Solvent | 40–100 |

In order to produce a coating composition having a flat finish and high angular sheen, the solvent(s) and diluent(s) are first mixed and the vinyl chloride copolymer solution resin dissolved therein. The vinyl chloride-vinylidene chloride resin is then added and dissolved in the solution. The urea-formaldehyde resin(s), plasticizer(s) stabilizer(s), pigment(s), modifying resin(s) and flatting paste are then added. (The flatting paste comprises a flatting agent that has been previously dispersed in solvent and one of the modifying resins, and may be prepared by treating these constituents in a pebble mill for about 6–8 hours.) The vinyl chloride dispersion resin is added last and the mixture stirred until a homogeneous mixture is obtained. The mixture may then be processed through a high-speed sand mill (such as disclosed in U.S. Patent 2,581,414) to a Hegman fineness of about 6. The vinyl dispersion resin may be omitted from the grind portion of the formula and incorporated afterward under agitation.

If a low angular sheen, flat finish is desired, the flatting paste is omitted from the charge that is treated in the mill, and is later added to the material that is obtained from the high-speed sand mill.

A high gloss coating composition may be prepared by omitting the flatting agent and replacing it with the acrylic solution resin.

A high gloss coating composition is made by mixing the solvent(s) and diluent(s), adding and dissolving the vinyl chloride copolymer solution resin therein, and adding and dissolving therein the vinyl chloride-vinylidene chloride resin. The urea-formaldehyde resin(s), plasticizer(s), stabilizer(s), acrylic syrup resin, air-dry or bake-type acrylic solution resin, pigment(s), and vinyl chloride dispersion resin may then be added and mixed therewith in a high-speed sand mill until a homogeneous mixture and Hegman fineness of about 6.5–7 is obtained. This may require two passes through the sand mill, instead of one as required for the material that produces a flat finish.

Examples I–IV, which follow, illustrate various liquid coating compositions that were prepared in accordance with my invention. Examples I–IV contain volatile materials within the range of 36–46% by weight based upon the total weight. The amount of volatile materials present in these compositions, however, may be increased, depending upon the method by which it is to be applied to the metal.

EXAMPLE I

| Constituents | Parts by Weight | Parts by Weight Non-Volatile Material | Parts by Weight Volatile Material | Percent by Weight Based on Non-Volatile Materials | Percent by Weight Based on Volatile Materials |
|---|---|---|---|---|---|
| Dispersion Resin: Bakelite QYNV | 211 | 211 | | 27.2 | |
| Solution Resin: Bakelite VMCC | 83 | 83 | | 11 | |
| Urea-Formaldehyde: | | | | | |
| Beckamine P-138 | 13 | 7.8 | 5.2 | 1.0 | 1.1 |
| Uformite F-240 | 13 | 7.8 | 5.2 | 1.0 | 1.1 |
| Acrylic Resin: Acryloid B-72 or Acryloid B-44 | 50 | 20 | 30 | 2.6 | 6.3 |
| Stabilizer: | | | | | |
| Bakelite ERL 2774 | 7.5 | 7.5 | | 1 | |
| Nuostabe 953 | 1 | 0.9 | 0.1 | .1 | .2 |
| Plasticizer: | | | | | |
| Emery 3049-D | 13 | 13 | | 1.7 | |
| Diisodecyl phthalate | 63 | 63 | | 8.1 | |
| Flatting Agent: Syloid 172 | 14 | 14 | | 1.8 | |
| Pigment: Non-chalking Rutile TiO$_2$ | 345 | 345 | | 44.5 | |
| Solvent: Isophorone | 57 | | 57 | | 12.0 |
| Diluent: Penola 150 | 374 | | 374 | | 79.3 |

Drying Schedule—60 sec. with heat at 500° F.
Gloss (Gardner 60°)—25–30%.
Hardness (Penetration by pencil at 45°)—2H.

EXAMPLE II

| Constituents | Parts by Weight | Parts by Weight Non-Volatile Material | Parts by Weight Volatile Material | Percent by Weight Based on Non-Volatile Materials | Percent by Weight Based on Volatile Materials |
|---|---|---|---|---|---|
| Dispersion Resin: Bakelite QYNV | 180 | 180 | | 26.1 | |
| Solution Resin: Bakelite VMCC | 64.6 | 64.6 | | 9.4 | |
| Urea-Formaldehyde: | | | | | |
| Beckamine P-138 | 11 | 6.6 | 4.4 | 1 | .9 |
| Uformite F-240 | 11 | 6.6 | 4.4 | 1 | .9 |
| Acrylic Resin: Acryloid B-72 or Acryloid B-44 | 44 | 17.0 | 27.0 | 2.5 | 5.9 |
| Stabilizer: | | | | | |
| Bakelite ERL 2774 | 6.5 | 6.5 | | .9 | |
| Nuostabe 953 | 1 | 0.9 | 0.1 | .1 | .02 |
| Plasticizer: | | | | | |
| Emery 3049-D | 11 | 11 | | 1.6 | |
| Diisodecyl phthalate | 55 | 55 | | 7.9 | |
| Flatting Agent: Syloid 162 | 53.5 | 53.5 | | 7.7 | |
| Pigment: Rutile TiO$_2$ | 288 | 288 | | 41.8 | |
| Solvent: Isophorone | 31.1 | | 31.1 | | 6.9 |
| Solvent-Diluent: Butyl Carbitol | 31.1 | | 31.1 | | 6.9 |
| Diluent: Penola 150 | 353.7 | | 353.7 | | 78.5 |

Drying Schedule—60 sec. with heat at 600° F.
Gloss (Gardner 60°)—6–7%.
Hardness (Penetration by pencil at 45°)—2H.

EXAMPLE III

| Constituents | Parts by Weight | Parts by Weight Non-Volatile Material | Parts by Weight Volatile Material | Percent by Weight Based on Non-Volatile Materials | Percent by Weight Based on Volatile Materials |
|---|---|---|---|---|---|
| Dispersion Resin: Bakelite QYNV | 101 | 101 | | 15.3 | |
| Solution Resin: Bakelite VMCC | 118 | 118 | | 17.9 | |
| Urea-Formaldehyde: | | | | | |
|   Beckamine P-138 | 10 | 6 | 4 | .9 | .7 |
|   Uformite F-240 | 10 | 6 | 4 | .9 | .7 |
| Acrylic Resin: Acryloid B-72 or Acryloid B-44 | 41 | 16.4 | 24.6 | 2.5 | 4.6 |
| Stabilizer: Bakelite ERL 2774 | 6 | 6 | | .9 | |
| Plasticizer: | | | | | |
|   Emery 3049-D | 10 | 10 | | 1.5 | |
|   Diisodecyl phthalate | 45 | 45 | | 6.9 | |
| Pigment: Rutile TiO$_2$ | 350 | 350 | | 53.2 | |
| Solvent: | | | | | |
|   Isophorone | 66 | | 66 | | 12.4 |
|   2-nitropropane | 39 | | 39 | | 7.3 |
| Solvent-Diluent: Butyl Carbitol | 160 | | 160 | | 30 |
| Diluent: Penola 150 | 225 | | 225 | | 42.3 |
| Diluent-Cosolvent: n-Butanol | 11 | | 11 | | 2.0 |

Drying Schedule—60 sec. with heat at 480° F.
Gloss (Gardner 60°)—80–90%.
Hardness (Penetration by pencil at 45°)—F-2H.

EXAMPLE IV

| Constituents | Parts by Weight | Parts by Weight Non-Volatile Material | Parts by Weight Volatile Material | Percent by Weight Based on Non-Volatile Materials | Percent by Weight Based on Volatile Materials |
|---|---|---|---|---|---|
| Dispersion Resin: Bakelite QYNV | 100 | 100 | | 14.9 | |
| Solution Resin: Bakelite VMCC | 118 | 118 | | 17.6 | |
| Urea-Formaldehyde: | | | | | |
|   Beckamine P-138 | 10 | 6 | 4 | .8 | .7 |
|   Uformite F-240 | 10 | 6 | 4 | .8 | .7 |
| Acrylic Resin: Acryloid B-72 or Acryloid B-44 | 50 | 20 | 30 | 2.9 | 5.8 |
| Stabilizer: Bakelite ERL 2774 | 6 | 6 | | .8 | |
| Plasticizer: | | | | | |
|   Emery 3049-D | 10 | 10 | | 1.5 | |
|   Diisodecyl phthalate | 52 | 52 | | 7.7 | |
| Flatting Agent: Syloid 162 | 5.4 | 5.4 | | .8 | |
| Pigment: Rutile TiO$_2$ | 350 | 350 | | 52.2 | |
| Solvent: | | | | | |
|   Isophorone | 67.3 | | 67.3 | | 13.1 |
|   2-nitropropane | 27 | | 27 | | 5.2 |
| Solvent-Diluent: Butyl Carbitol | 144.3 | | 144.3 | | 28 |
| Diluent: Penola 150 | 229.9 | | 229.9 | | 44.6 |
| Diluent-Cosolvent: n-Butanol | 10 | | 10 | | 1.9 |

Drying Schedule—60 sec. with heat at 480° F.
Gloss (Gardner 60°)—60%±3%.
Hardness (Penetration by pencil at 45°)—2H.

The foregoing detailed description has been given for clearness of understanding only, and no unnecessary limitations should be understood therefrom, as modifications will be obvious to those skilled in the art.

I claim:

1. A liquid coating composition suitable for use in coating metal and being baked thereon to provide an adherent coating, which comprises: an organosol component having a vinyl chloride polymer dispersion resin dispersed in an organic liquid vehicle; a vinyl chloride copolymer solution resin that is a member of the group consisting of vinyl chloride-vinyl acetate and vinyl chloride-one-half lower alkyl ester of maleic acid; and acrylic resin component from the group consisting of polymeric methyl methacrylate in methyl methacrylate monomer, acrylic solution resin which are polymers and/or copolymers of lower alkyl methacrylates or acrylates, and admixtures thereof; a butylated urea-formaldehyde solution resin; and volatile liquid from the group consisting of organic solvent, organic diluent, and admixtures thereof; said composition having about 20–70% by weight non-volatiles containing about 10–50 parts by weight vinyl chloride dispersion resin, about 5–40 parts by weight vinyl chloride copolymer solution resin, about 0.5–10 parts by weight acrylic resin component, and about 1–10 parts by weight of butylated urea-formaldehyde resin; and said composition being capable of being filmed as a compatible, substantially homogeneous composition onto a metal surface and of being baked thereon at a temperature of about 350–500° F. to form a cured adherent coating.

2. A liquid coating composition suitable for use in coating metal and being baked thereon to provide an adherent coating, which comprises: an organosol component having a vinyl chloride polymer dispersion resin dispersed in an organic liquid vehicle; a vinyl chloride copolymer solution resin that is a member of the group consisting of vinyl chloride-vinyl acetate and vinyl chloride-one-half lower alkyl ester of maleic acid; a vinyl chloride-vinylidene chloride solution resin; an acrylic resin component from the group consisting of polymeric methyl methacrylate in methyl methacrylate monomer, acrylic solution resin which are polymers and/or copolymers of lower alkyl methacrylates or acrylates, and admixture thereof; a butylated urea-formaldehyde solution resin; and volatile liquid from the group consisting of organic solvent, organic diluent, and admixtures thereof; said composition having about 20–70% by weight non-volatiles containing about 10–50% by weight vinyl chloride dispersion resin, about 5–30% by weight vinyl chloride copolymer solution resin, about 0–10% by weight vinyl chloride-vinylidene chloride solution resin, about 0.5–10% by weight acrylic resin, and about 1–10% by weight of butylated urea-formaldehyde and said composition being capable of being filmed as a compatible, substantially homogeneous composition onto a metal surface and of being baked thereon at a temperature of about 350–500° F. to form a cured adherent coating.

References Cited by the Examiner

UNITED STATES PATENTS

| | | | |
|---|---|---|---|
| 2,666,719 | 1/1954 | Lissant | 117—132 |
| 2,751,364 | 6/1956 | Whetstone et al. | 260—853 X |
| 2,906,724 | 9/1959 | Daniel | 260—45.2 |
| 3,050,495 | 8/1960 | Christenson | 260—45.2 |
| 3,097,108 | 7/1963 | Bosmajian | 117—132 |
| 3,114,725 | 12/1963 | Kaufman et al. | 260—836 X |

LEON J. BERCOVITZ, *Primary Examiner.*

DONALD E. CZAJA, *Examiner.*

J. J. KLOCKO, *Assistant Examiner.*